United States Patent
Mango

(10) Patent No.: US 9,296,324 B2
(45) Date of Patent: Mar. 29, 2016

(54) CONDIMENT PACKET HOLDER FOR USE WITH AN AUTOMOBILE CUPHOLDER

(71) Applicant: Philip J. Mango, Frisco, TX (US)

(72) Inventor: Philip J. Mango, Frisco, TX (US)

(*) Notice: Subject to any disclaimer, the term of this patent is extended or adjusted under 35 U.S.C. 154(b) by 99 days.

(21) Appl. No.: 14/269,989

(22) Filed: May 5, 2014

(65) Prior Publication Data

US 2014/0326768 A1 Nov. 6, 2014

Related U.S. Application Data

(60) Provisional application No. 61/819,240, filed on May 3, 2013.

(51) Int. Cl.
*B60N 3/10* (2006.01)

(52) U.S. Cl.
CPC ............... *B60N 3/103* (2013.01); *B60N 3/104* (2013.01)

(58) Field of Classification Search
CPC .......... B60R 11/00; B60N 3/10; B60N 3/103; B60N 3/104
USPC ......... 224/483, 276, 556, 275, 926, 482, 544, 224/539; 403/374.4; D7/590, 600.1
See application file for complete search history.

(56) References Cited

U.S. PATENT DOCUMENTS

| | | | | |
|---|---|---|---|---|
| 5,052,649 A | * | 10/1991 | Hunnicutt | A47G 23/0225 224/926 |
| 5,108,059 A | * | 4/1992 | Curtis | A47G 23/0225 248/146 |
| 5,897,041 A | * | 4/1999 | Ney | B60N 3/101 224/483 |
| 6,543,637 B1 | * | 4/2003 | Osborn | A47G 23/0216 220/737 |
| 9,199,584 B2 | * | 12/2015 | Mango | B60R 11/00 |

* cited by examiner

*Primary Examiner* — Adam Waggenspack

(57) ABSTRACT

An improved condiment packet holder of molded plastic has a generally centrally located aperture sized and shaped: to receive along a first orientation a body of a first condiment packet having a first shape, and to suspend that first condiment packet by supporting, on first portions of the surface surrounding the aperture, at least end portions of a flange protruding at the top of the first condiment packet, and to receive in a second orientation transverse to the first orientation a body of a second condiment packet having a second shape different that the first shape, and to suspend that second condiment packet by supporting, on second portions of the surface surrounding the aperture, at least end portions of a flange protruding at the top of the second condiment packet.

20 Claims, 7 Drawing Sheets

CONDIMENT PACKET HOLDER FOR USE WITH AN AUTOMOBILE CUPHOLDER

This application incorporates by reference U.S. Provisional Patent Application No. 61/553,705 entitled "CONDIMENT PACKET HOLDER FOR USE WITH AN AUTOMOBILE CUPHOLDER OR AIR VENT" and filed on Oct. 31, 2011, U.S. Provisional Patent Application No. 61/610,898 entitled "CONDIMENT HOLDER FOR USE WITH AN AUTOMOBILE CUPHOLDER OR AIR VENT" and filed on Mar. 14, 2012, and U.S. Non-Provisional patent application Ser. No. 13/664,676 entitled "CONDIMENT PACKET HOLDER FOR USE WITH AN AUTOMOBILE CUPHOLDER OR AIR VENT" and filed Oct. 31, 2012.

TECHNICAL FIELD

The present application relates generally to a holder for disposable condiment packets and, more specifically, to a condiment packet holder adapted for mounting within an automobile cup-holder or air vent.

BACKGROUND

Fast food consumers often prefer to consume certain foods with a condiment that cannot be applied to the food until the food is to be eaten, or else the quality of the food will deteriorate. For example, many people enjoy ketchup (catsup) on french fries (often just called "fries"). However, when ketchup is applied to fries, the ketchup typically soaks into the fries within a short period of time, rendering the fries soggy and unappealing. Likewise, chicken "nuggets" (also called chicken tenders or strips) are often sold by fast food establishments with a choice of condiment, such as barbeque, honey mustard or sweet and sour sauce, ranch dressing, etc. As with ketchup and fries, applying the sauce at the time of sale will result in the chicken nuggets quickly becoming soggy. With both fries and chicken nuggets, applying the condiment to the food at the time of sale also causes the food to become undesirably messy for eating with just the consumer's fingers. Most customers prefer to individually dip their fries or chicken nuggets into the condiment a few moments before eating. Accordingly, condiments for such foods are typically dispensed by fast food enterprises in disposable packets, separate from the food or even the food packaging.

While dipping sauces for nuggets have been sold in rectangular or cylindrical plastic tubs having a peel-off covering (see FIG. 8), until recently personal portions of ketchup, mustard, mayonnaise, tartar sauce and relish have been predominantly dispensed by fast food enterprises in plastic or polymeric pouch-like envelopes that are torn open at one corner and squeezed to dispense the condiment. Of course, fries could not be dipped into ketchup held by such packets, requiring that the ketchup be dispensed onto a surface or into an open-top container to allow dipping. Recently, however, H.J. Heinz Company began national sales of ketchup in their "Dip & Squeeze" packets. FIGS. 7A and 7B are top and bottom perspective views of that condiment packet design, reproduced from U.S. Pat. No. D634,643. The generally-plastic packet body shown in those figures is sealed by a peel-off cover of a flexible material, as described in further detail in U.S. Patent Application Publication No. 2010/0270330, and holds approximately one ounce of ketchup.

While allowing dipping of food into a condiment held by the open-top packet (once the cover is peeled off), the condiment packet design disclosed in the patent documents identified above remains problematic for use in automobiles. The packet must be held in one hand while the other hand holds and dips the food item being eaten. Alternatively, the open-top packet must rest on a generally level surface while the food item is dipped into the condiment contained therein. Normal automotive operation requires the driver to have at least one hand substantially continuously gripping the steering wheel, and passengers often do not have two free hands either. Merely setting the condiment packet on the surface of a seat, console, armrest, dashboard or the like within the vehicle leaves the packet subject to sliding, tipping and/or falling due to inertia and momentum in response to changes in the vehicle's speed or direction. Placing the packet within a cup-holder in the vehicle will usually cause the packet to be at an inconvenient position for dipping the food item in the condiment, since the cup-holder will normally be too deep and narrow to allow easy dipping of a food item held in a person's hand.

There is, therefore, a need in the art for an improved condiment packet holder.

SUMMARY

An improved condiment packet holder of molded plastic has a generally centrally located aperture sized and shaped: to receive along a first orientation a body of a first condiment packet having a first shape, and to suspend that first condiment packet by supporting, on first portions of the surface surrounding the aperture, at least end portions of a flange protruding at the top of the first condiment packet, and to receive in a second orientation transverse to the first orientation a body of a second condiment packet having a second shape different that the first shape, and to suspend that second condiment packet by supporting, on second portions of the surface surrounding the aperture, at least end portions of a flange protruding at the top of the second condiment packet.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6D, discussed below, and the various embodiments used to describe the principles of the present disclosure in this patent document are by way of illustration only and should not be construed in any way to limit the scope of the disclosure.

Figure 1:
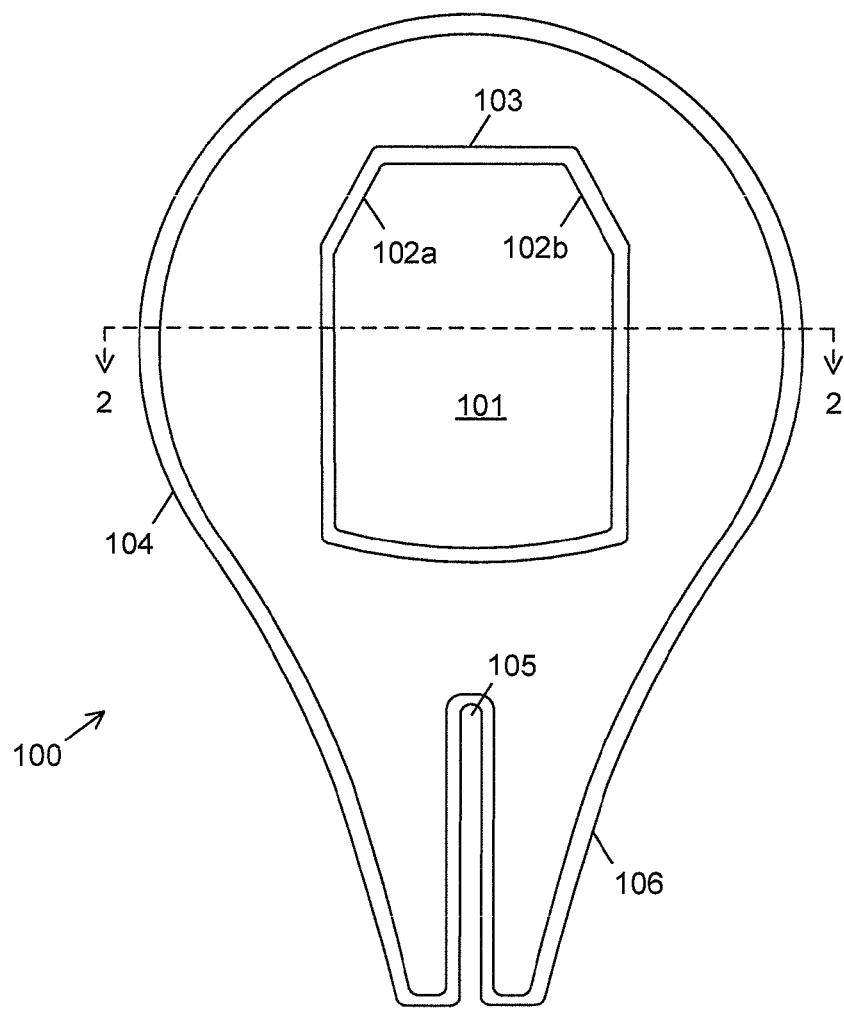
FIG. 1 is a top plan view of a condiment packet holder according to one embodiment of the present disclosure.
Figure 2:
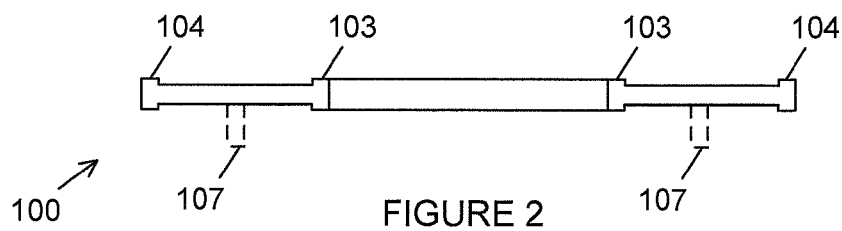
FIG. 2 is a sectional view of the condiment packet holder of FIG. 1, taken at section line 2-2.
Figure 3:
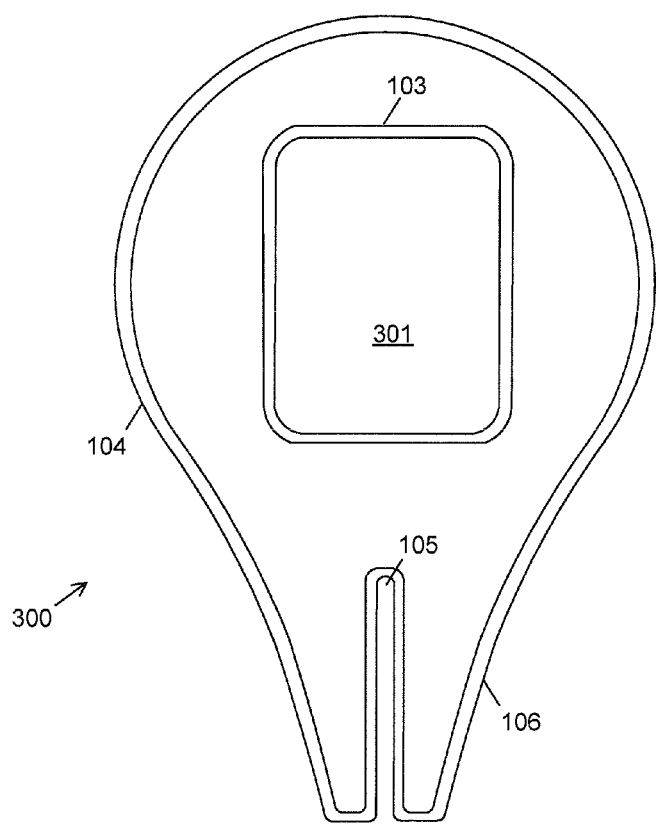
FIG. 3 is a top plan view of a condiment packet holder according to another embodiment of the present disclosure.

FIG. 1 is a top plan view of a condiment packet holder according to one embodiment of the present disclosure, while FIG. 2 is a sectional view of the condiment packet holder 100 of FIG. 1 taken at section line 2-2. FIG. 3 is a top plan view of a condiment packet holder according to another embodiment of the present disclosure. Condiment packet holder 100, 300 includes a body having an aperture 101, 301 therethrough, for receiving the body of the condiment packet. The shape of the aperture 101, 301 must necessarily be shaped to substantially conform to the shape of the body of the condiment packets to be held. For instance, the aperture 101 in the exemplary embodiment of FIGS. 1 and 2 is shaped to receive and hold packets having a body with the shape depicted in FIGS. 7A-7B, and is thus generally rectangular but with counterpart end portions 103a, 103b of each long side of the rectangle angled inward, similar to a trapezoid. The edges of the aperture 101 need not be straight, but may instead be slightly curved as illustrated at the bottom of the aperture 101 depicted in FIG. 1. The corners of the aperture 101 are preferably rounded.

Figure 7A:
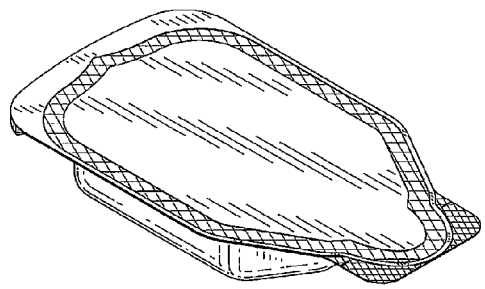
FIGS. 7A and 7B are top and bottom perspective views of an existing condiment packet design.
Figure 7B:
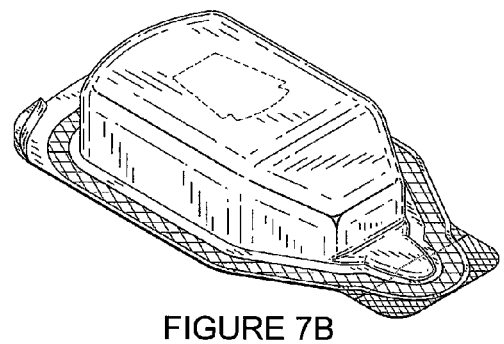

The aperture 101 shown in the exemplary embodiment of FIGS. 1 and 2 is sized to receive the body of the condiment packet depicted in FIGS. 7A-7B and to hold that packet suspended, supported by the protruding lip or flange extending laterally from around the periphery at the top of the packet body. That is, the flange at the top of the condiment packet rests on the upper surface of the condiment packet holder 100, while the body is received by the aperture 101 and hangs from the protruding packet lip through and below the aperture 101. The aperture 101 depicted in FIG. 1 thus has a width of about 1.25 inches and a length of about 2.25 to 2.5 inches, sufficient to receive the body of the packet in FIGS. 7A-7B but smaller than the length and width of the lip or flange protruding (by about 0.25 inches) laterally around the top of that packet.

Figure 2A:
FIGS. 2A and 2B illustrate the alternative manners by which the condiment packet holder of FIGS. 1 and 2 may support a condiment packet.
Figure 2B:
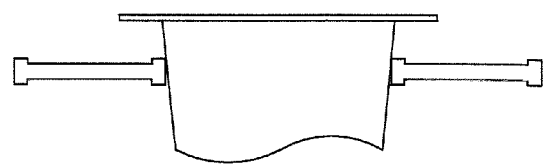

FIGS. 2A and 2B illustrate the alternative manners by which the condiment packet holder of FIGS. 1 and 2 may support a condiment packet. As shown in FIG. 2A, the aperture in the condiment packet holder may be sized larger than the width and length of the condiment packet body but smaller than the outer dimensions of the protruding flange at the top of the condiment packet body, so that the condiment packet is suspended by the protruding flange. Alternatively, as shown in FIG. 2B, for a condiment packet with battered or sloped sides, the aperture may be sized to catch the sides of the condiment packet, leaving a small portion of the condiment packet extending above the upper surface of the condiment packet holder for ease in grasping for removal.

The aperture could alternatively be entirely rectangular (except, perhaps, for having rounded corners), without the angled end portions shown in FIG. 1. The aperture 301 depicted in FIG. 3 illustrates this variation. The aperture 301 depicted in FIG. 3 thus has a width of about 1.25 inches and a length of about 1.75 inches, sufficient to receive the body of the packets depicted in FIGS. 7A-7B but smaller than the length and width of the flange or lip (typically between 0.125 and 0.25 inches) protruding laterally around the top of those packets. If appropriately sized, the modified aperture 301 would still receive the body of and support the packet depicted in FIGS. 7A-7B. However such a modified aperture would also support other condiment packet designs of similar rectangular shape (and approximately the same body and flange dimensions), such as those illustrated in FIG. 8. Of course, for generally cylindrical or frusto-conical condiment packets, the aperture should be circular. The aperture may also be square, triangular or trapezoidal in shape, depending on the condiment packets to be supported.

Figure 8:
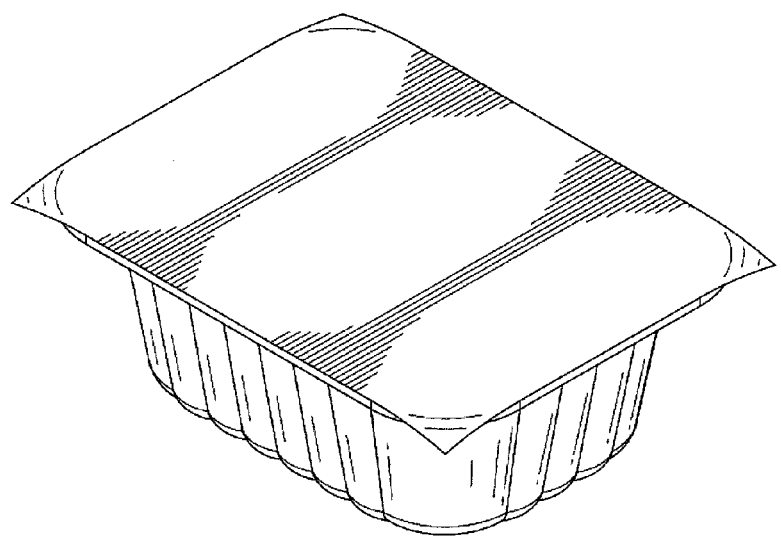
FIG. 8 contains several perspective views of an alternate existing condiment packet design.

The length and width of the aperture 101, 301 is slightly larger than the corresponding length and width of the body of the packet depicted in FIGS. 7A-7B or FIG. 8 just below the flange, allowing the aperture to receive the body of that packet with clearance of at least about $1/32^{nd}$ to $1/8^{th}$ of an inch while remaining smaller than the length and width of the flange. Of course, the length and width of the aperture 101, 301 need not necessarily be smaller than both the corresponding length and width of the flange around the top of the condiment packet. Instead, for at least generally rectangular shaped condiment packets having a length significantly greater than the width, only one of the length and width of the aperture need be smaller than either the corresponding length or the corresponding width of the flange around the packet body.

For example, the aperture could be generally square with a dimension smaller than the length of the flange on the packets of FIGS. 7A-7B, and would thus receive the body of and support those packets regardless of whether inserted with a first orientation or with a second orientation rotated approximately 90° relative to the first orientation. That is, at least a portion of the flange of the packet would rest on the surface of the condiment packet holder at opposite ends of the condiment packet, but not necessarily along other sides of the packet. Such an aperture might thus function with condiment packets of a variety of sizes, limited only in that the flange must significantly exceed (preferably by at least one-quarter to one-half of an inch) the dimension of the aperture, and that the length of the packet body just below the flange prevent the packet from sliding within the aperture until the lip is no longer supported at one end. By preference, however, during use the flange of a condiment packet is supported by the surface of the condiment packet holder 100 around at least a majority of the periphery thereof, and even more preferably around an entirety of the periphery for that flange. Thus, while the aperture may be sized and/or shaped to receive condiment packets within a range of sizes, such range is preferably kept small, and in any event well below the minimum dimension by which the flange projects outward from the packet body just below the flange.

The periphery of the planform for the body of condiment packet holder 100, 300 surrounding the aperture 101, 301 is generally circular, although in some embodiments the body for condiment packet holder 100, 300 may be completely circular in planform. That is, the body of such embodiments has a cylindrical three-dimensional shape forming, with aperture 101 or 301, a generally annular planform. The preferred embodiment, however, includes a protrusion from a portion of the circular planform, discussed in further detail below.

The thickness of the body is preferably between about one-quarter of an inch and 30 millimeters (mm), and more preferably about one-sixteenth of an inch. The body is preferably rigid or semi-rigid and may be formed of molded, recyclable thermoplastic or thermosetting polymeric or plastic material such as polyethylene terephthalate (PET). The body is preferably formed with ridges or raised lips 103, 104 on both sides around the periphery of the aperture 101, 301 and around the outer periphery of the body.

The outer diameter for the circular portion of the body should be between about 3.5 and 4.5 inches and preferably between about 3.75 and 4.0 inches. Automobile cup-holders within a fixed or fold-down central console generally contain a rubber insert having an inner diameter of about 2.5 to more than 3.0 inches, to receive and hold a standard 12 ounce aluminum beverage can or 20 ounce plastic bottle, as well as other beverage containers formed with at least a bottom portion thereof having a similar size. Near the top of those cup-holders is a lip or rim of as much as one-quarter to one-half inch in width, surrounded by wall formed by the console material. Cup-holders on the dashboard or doors of an automobile will often have a similar shape. The condiment packet holder 100 is intended to be received by the upper wall portion of the cup-holder, to rest on the rim or lip that is not far below uppermost portion of the cup-holder but which may be several inches above the bottom of the cup-holder on which beverage containers rest. The condiment packet supported by the condiment packet holder is thus suspended in the region normally occupied by a beverage container when placed in the cup-holder, at a convenient height above the bottom of the cup-holder.

Many cup-holders include an open area along some portion of the periphery of the upper wall. For those cup-holders not including such a cup-holder, the planform of the condiment packet holder should be circular as described above. However, where such openings are included in the upper periphery of the cup-holder, the planform preferably includes a protrusion 106 at one end, end at least one and as many as three inches past the outer diameter of the circular portion of the planform. The protrusion 106 includes a narrow slot 105 (one-sixteenth to one-quarter of an inch in width) configured receive the vertical louver or slat of an air vent closure mechanism. The sides of the protrusion 106 are tapered or arcuate, to facilitate wedging the protrusion between adjacent slats to those received by the slot 105. In this manner, the condiment packet holder 100, 300 may be mounted onto an air vent within the automobile, for cases in which either such mounting is preferable or placement within a cup-holder is not feasible.

In one embodiment, the condiment packet holder 100, 300 may optionally include on one side an annular protrusion 107 intended to be received by an upper interior portion of the cup-holder (e.g., about three inches or less in outer diameter, about one-sixteenth of an inch thick and approximately one-half inch in height).

Figure 4:
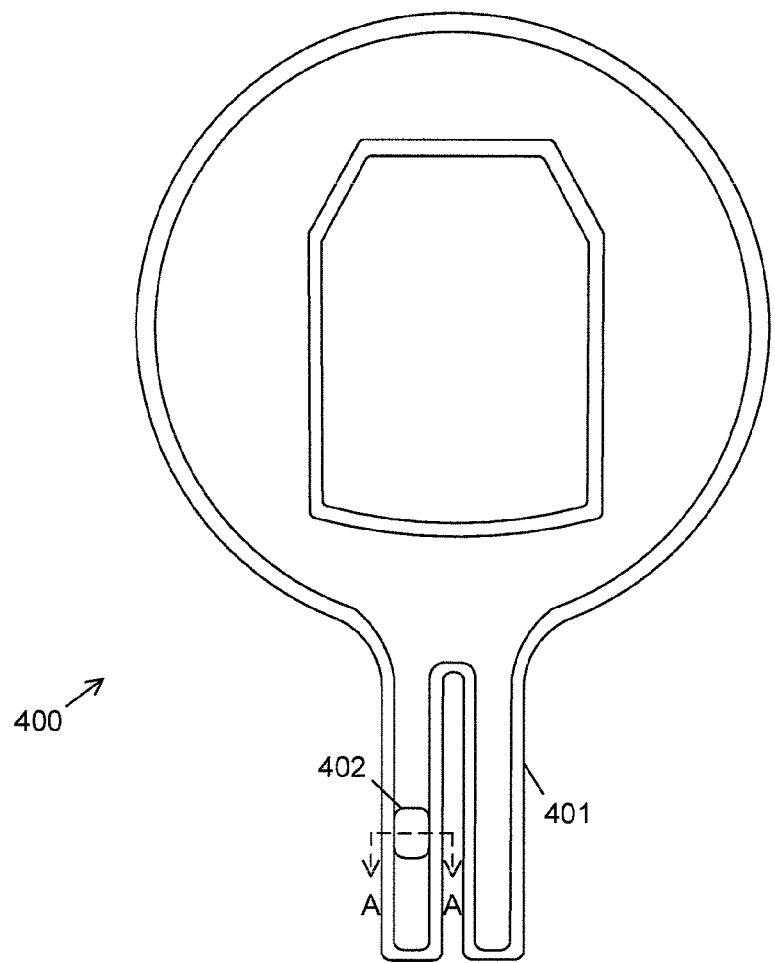
FIG. 4 is a top plan view of a condiment packet holder according to yet another embodiment of the present disclosure.
Figure 4A:
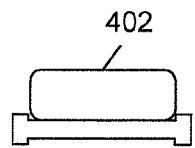
FIG. 4A is a section view taken at section lines A-A in FIG. 4.
Figure 4B:
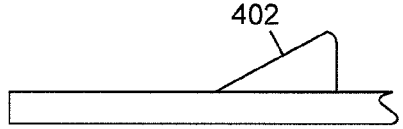
FIG. 4B is a side view of a portion of the structure illustrated in FIG. 4.

FIG. 4 is a top plan view of a condiment packet holder according to yet another embodiment of the present disclosure. FIG. 4A is a section view taken at section lines A-A in FIG. 4, and FIG. 4B is a side view of a portion of the structure illustrated in FIG. 4.

Condiment packet holder 400 depicted in FIG. 4 has a similar structure and is manufactured in substantially the same manner as described above in connection with condiment packet holders 100 and 300. However, the planform of condiment packet holder 400 includes a protrusion 401 with substantially straight prongs, rather than being arcuate for wedging of the protrusion in an air vent as described above.

In addition, a wedge-shape "shark tooth" 402 is mounted on at least one of the prongs for protrusion 401, and optionally separate teeth are mounted on each prong. In the example shown, the tooth 402 slopes down toward the free end of the prong and is mounted on a top surface of the prong, although optionally the tooth may be oriented to slope down away from the free end of the prong and/or be mounted on a bottom surface, or multiple teeth may be mounted on each prong with either the same or opposite orientations and/or on the same or on opposite sides of the condiment packet holder 400. The tooth 402 or teeth assist in wedging the condiment packet holder 400 into an automobile air vent, to retain the condiment packet holder 400 in position.

Figure 5:
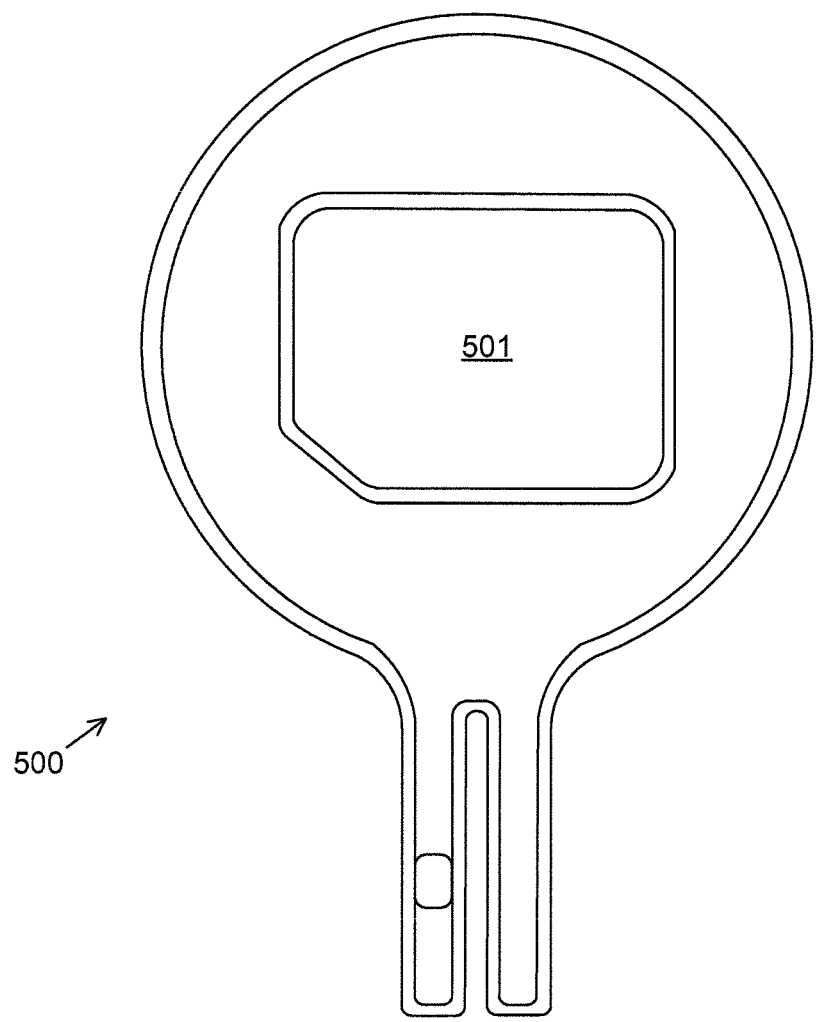
FIG. 5 is a top plan view of a condiment packet holder according to still another embodiment of the present disclosure, illustrating additional design concepts.

FIG. 5 is a top plan view of a condiment packet holder according to still another embodiment of the present disclosure, illustrating additional design concepts. In particular, the condiment packet holder 500 of FIG. 5 illustrates two design concepts: First, the aperture 501 for receiving and suspending a condiment packet need not have any particular orientation with respect to the protrusion. Thus, for example, the long dimension of the aperture 501 may be transverse in orientation to the direction in which the protrusion extends as illustrated in FIG. 5, rather than oriented in the same direction as illustrated in FIGS. 1, 3 and 4. Second, the size and shape of the aperture 501 may be "keyed" to the condiment packets of a specific vendor. Thus, for instance, the condiment packet of a particular vendor may have a specific perimeter shape (i.e., rectangular with one truncated or "clipped" corner as shown in FIG. 5). The aperture may be shaped to receive and support condiment packet of that particular vendor, to the exclusion of being able to support competitors' condiment packets (i.e., a rectangular condiment packet without the clipped corner would not be received by the aperture in FIG. 5). Similarly, for a condiment packet sized with significantly larger transverse dimensions than normal, and with only a small protruding flange, the aperture may be sized to receive and support the packet in an aperture too large to support competitors' packets.

Figure 6A:
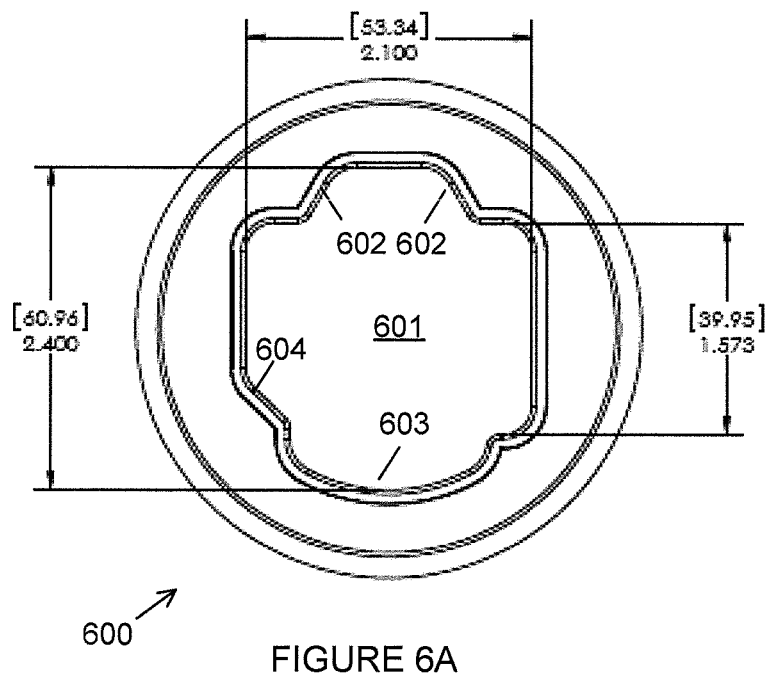
FIG. 6A is a top plan view.
Figure 6B:
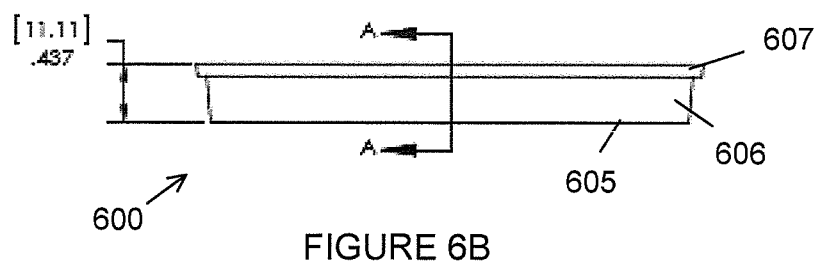
FIG. 6B is a side elevation view.
Figure 6C:
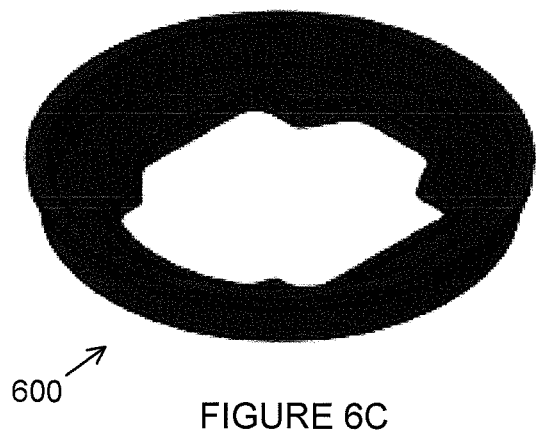
FIG. 6C is a perspective view of an improved condiment packet holder according to yet another embodiment of the present disclosure.
Figure 6D:
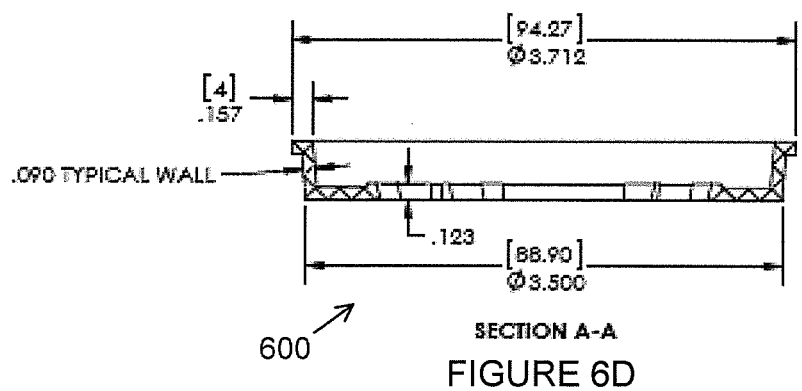
FIG. 6D is a section view taken at section lines A-A in FIG. 6B.

FIG. 6A is a top plan view, FIG. 6B is a side elevation view, and FIG. 6C is a perspective view of an improved condiment packet holder according to yet another embodiment of the present disclosure. FIG. 6D is a section view taken at section lines A-A in FIG. 6B. The improved condiment packet holder 600 is intended for use only with a cupholder, and not also with an air vent as described above in connection with other embodiments. The improved condiment packet holder 600 includes an aperture 601 that is an overlay of two apertures oriented transversely to each other.

Thus, the aperture 601 has a shape or perimeter substantially matching that of aperture 101 described above, oriented in a first direction (vertically in the embodiment shown in FIG. 6A), and an overlaid shape or perimeter substantially matching that of aperture 501 described above, oriented in a second direction transverse to the first direction (horizontally in the embodiment shown in FIG. 6A). The resulting combined shape or outline of the aperture 601 is a cross form, with the edges 602 of one arm tapered or angled, an end 603 of the opposite arm of the cross that is radiused or curved, and a corner 604 of one of the transverse arms that is clipped. The aperture 601 is thus configured, and the dimensions of the arms of the cross shape of the aperture 601 selected, to receive condiment packets of different shapes in different orientations. A condiment packet with the shape discussed above in connection with FIG. 1 may be received in the aperture 601 and held by the improved condiment packet holder 600 in the first orientation, while a condiment packet with the shape discussed above in connection with FIG. 5 may be received in the aperture 601 and held by the improved condiment packet holder 600 in the second orientation transverse to the first orientation.

As apparent from FIGS. 6B and 6C, the improved condiment packet holder 600 includes features designed to facilitate placement within an automobile cupholder. Thus, the improved condiment packet holder has a bottom surface 605 that is downset relative to a top of the condiment packet holder 600, with the open space between the opposition portions of the sidewall 606 producing a shallow cup shape rather than a flat disk shape for the generally cylindrical structure. In addition, the slightly sloped (angled or "battered") sidewall 606 that tapers inward from the top to the bottom of the condiment packet holder 600 produces an inverted frusto-conical side profile for the bottom portion of the condiment packet holder 600, below the protruding lip 607 at the top. The sloped sidewalls 606 and protruding lip 607 collectively serve to ensure that the improved condiment packet holder 600 is held at the top of the cupholder, either wedged in the open top of the cupholder by sidewalls 606 or resting on the top of the cupholder opening by protruding lip 607, or both.

The condiment packet holder 100, 300, 400, 500, 600 of the present disclosure is simple and very inexpensive to manufacture in volume. Thus, fast food enterprises may give away the condiment packet holder as part of the customer's purchase or as a promotional item, or may simply have such condiment packet holders available to be given or sold to the customer upon request at no charge or for a nominal price. Of course, the surfaces of condiment packet holder 100 may bear any graphic and/or printed matter desired in connection with the article's promotional nature, and such graphic and/or printed matter may periodically or intermittently be changed in different lots of the condiment packet holder produced near the time of different events (such as the release of new movies).

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A condiment packet holder for use in an automobile, the condiment packet holder comprising:
a molded cylindrical body having an outer diameter of between 3.5 inches and 4.5 inches and including
a peripheral rim,
a central floor offset from the peripheral rim and having a thickness of between 0.25 inches and 0.0625 inches, and
sloped sidewalls along at least part of a distance between the peripheral rim and the central floor,
wherein the central floor and at least part of the sloped sidewalls are sized and shaped to be received within a recess in an automobile cup-holder insert; and
a cross-shaped aperture through the central floor, the cross-shaped aperture having first and second opposing arms oriented along a first direction and third and fourth opposing arms oriented along a second direction transverse to the first direction,
wherein the first and second opposing arms are configured to receive portions of a first condiment packet having a first peripheral shape and the third and fourth opposing arms are configured to receive portions of a second condiment packet having a second peripheral shape different than the first peripheral shape.

2. The condiment packet holder according to claim 1, wherein the first arm is tapered.

3. The condiment packet holder according to claim 2, wherein the second arm has an arcuate end.

4. The condiment packet holder according to claim 1, wherein the second peripheral shape is generally rectangular.

5. The condiment packet holder according to claim 4, wherein the generally rectangular peripheral shape includes at least one clipped corner.

6. The condiment packet holder according to claim 1, wherein ends of the first and second opposing arms are separated by a distance corresponding to a length of the first condiment packet and ends of the third and fourth opposing arms are separated by a distance corresponding to a length of the second condiment packet, and wherein the first and second opposing arms each have widths corresponding to a width of the first condiment packet and the third and fourth opposing arms each have widths corresponding to a width of the second condiment packet.

7. A condiment packet holder for use in an automobile, the condiment packet holder comprising:
a molded body having a thickness of between 0.25 inches and 0.0625 inches, wherein the molded body includes a cylindrical portion having an outer diameter of between 3.5 inches and 4.5 inches, a protruding rim at a top of the molded body, and a central portion offset from the protruding rim, wherein the cylindrical portion configured to be received by an automobile cup-holder and supported by a portion of the automobile cup-holder insert around at least a portion of a periphery of the molded body by at least one of sloped sidewalls of the molded body and the protruding rim; and
a cross-shaped aperture through the central portion of the molded body, the aperture having first and second opposing arms oriented along a first direction and third and fourth opposing arms oriented along a second direction transverse to the first direction, wherein the first and second opposing arms are configured to receive portions of a first condiment packet and the third and fourth opposing arms are configured to receive portions of a second condiment packet having a different peripheral shape than the first condiment packet.

8. The condiment packet holder according to claim 7, wherein edges of the first arm are tapered and a corner of the third arm is clipped.

9. The condiment packet holder according to claim 7, wherein a corner of the third arm is clipped.

10. The condiment packet holder according to claim 7, wherein the central portion of the molded body includes a disk-shaped floor at an end of the sloped sidewalls opposite the protruding rim, wherein the floor includes the cross-shaped aperture.

11. The condiment packet holder according to claim 7, wherein the first and second opposing arms are keyed, except for a central region at which all of the first, second, third and fourth opposing arms terminate, to a periphery of the first condiment packet, and wherein the third and fourth opposing arms are keyed, except for the central region, to a periphery of the second condiment packet.

12. The condiment packet holder according to claim 7, wherein ends of the first and second opposing arms are separated by a distance corresponding to a length of the first condiment packet and ends of the third and fourth opposing arms are separated by a distance corresponding to a length of the second condiment packet.

13. The condiment packet holder according to claim 7, wherein the first and second opposing arms each have widths corresponding to a peripheral shape of the first condiment packet and the third and fourth opposing arms each have widths corresponding to the peripheral shape of the second condiment packet.

14. The condiment packet holder according to claim 7, wherein the body is formed of molded plastic.

15. A condiment packet holder for use in an automobile, the condiment packet holder comprising:
 a molded cylindrical body having an outer diameter of between 3.5 inches and 4.5 inches and including
  a peripheral rim,
  a central floor offset from the peripheral rim and having a thickness of between 0.25 inches and 0.0625 inches, and
  sloped sidewalls along at least part of a distance between the peripheral rim and the central floor,
 wherein the central floor and at least part of the sloped sidewalls are sized and shaped to be received within a recess in an automobile cup-holder insert, and wherein the peripheral rim is sized and shaped to support the molded cylindrical body above a bottom of the automobile cup-holder insert by contact with a rim of the automobile cup-holder insert; and
 a cross-shaped aperture through the central floor, the cross-shaped aperture having first and second opposing arms oriented along a first direction and third and fourth opposing arms oriented along a second direction transverse to the first direction,
 wherein the first and second opposing arms are configured to receive portions of a first condiment packet having a first peripheral shape and the third and fourth opposing arms are configured to receive portions of a second condiment packet having a second peripheral shape different than the first peripheral shape.

16. The condiment packet holder according to claim 15, wherein the first arm is tapered and the second arm has an arcuate end.

17. The condiment packet holder according to claim 15, wherein the first and second opposing arms of the cross-shaped aperture are keyed to the first peripheral shape.

18. The condiment packet holder according to claim 17, wherein the first peripheral shape is generally rectangular.

19. The condiment packet holder according to claim 18, wherein the generally rectangular peripheral shape includes at least one clipped corner.

20. The condiment packet holder according to claim 15, wherein ends of the first and second opposing arms are separated by a distance corresponding to a length of the first condiment packet and ends of the third and fourth opposing arms are separated by a distance corresponding to a length of the second condiment packet, and wherein the first and second opposing arms each have widths corresponding to a width of the first condiment packet and the third and fourth opposing arms each have widths corresponding to a width of the second condiment packet.

* * * * *